United States Patent [19]

Salisbury

[11] 4,045,200
[45] Aug. 30, 1977

[54] METHOD OF FORMING GLASS SUBSTRATES WITH PRE-ATTACHED SEALING MEDIA

[75] Inventor: Charles W. Salisbury, Risingsun, Ohio

[73] Assignee: Owens-Illinois, Inc., Toledo, Ohio

[21] Appl. No.: 537,897

[22] Filed: Jan. 2, 1975

[51] Int. Cl.² ............................................. C03C 27/00
[52] U.S. Cl. ............................................. 65/42; 65/43; 65/58
[58] Field of Search ................... 65/36, 42, 43, 38, 58; 313/220, 221, 217, 188

[56] References Cited

U.S. PATENT DOCUMENTS

| | | | |
|---|---|---|---|
| 2,977,722 | 4/1961 | Mazzoni | 65/58 X |
| 3,485,648 | 12/1969 | Bishop | 65/33 X |
| 3,778,126 | 12/1973 | Wilson | 65/58 X |
| 3,862,830 | 1/1975 | Stern | 65/43 X |

*Primary Examiner*—Arthur D. Kellogg

[57] ABSTRACT

Glass substrates having electrical conductors deposited thereon used in gas panel fabrication with vitreous or crystalline solder glass attached thereto are disclosed as well as a method of applying and attaching said solder glass to such substrates.

3 Claims, No Drawings

METHOD OF FORMING GLASS SUBSTRATES WITH PRE-ATTACHED SEALING MEDIA

BACKGROUND OF THE INVENTION

This invention relates to the manufacture of gas discharge devices, especially A.C. (alternating current) multiple gas discharge display/memory devices which have an electrical memory and which are capable of producing a visual display or representation of data such as numerals, letters, radar displays, aircraft displays, binary words, educational displays, etc.

Multiple gas discharge display and/or memory panels of one particular type with which the present invention is concerned are characterized by an ionizable gaseous medium, usually a mixture of at least two gases at an appropriate gas pressure, in a thin gas chamber or space between a pair of opposed dielectric charge storage members which are backed by conductor (electrode) members, the conductor members backing each dielectric member typically being appropriately oriented so as to define a plurality of discrete gas discharge units or cells.

In some prior art panels the discharge cells are additionally defined by surrounding or confining physical structure such as apertures in perforated glass plates and the like so as to be physically isolated relative to other cells. In either case, with or without the confining physical structure, charges (electrons, ions) produced upon ionization of the elemental gas volume of a selected discharge cell, when proper alternating operating potentials are applied to selected conductors thereof, are collected upon the surfaces of the dielectric at specifically defined locations and constitute an electrical field opposing the electrical field which created them so as to terminate the discharge for the remainder of the half cycle and aid in the initiation of a discharge on a succeeding opposite half cycle of applied voltage, such charges as are stored constituting an electrical memory.

Thus, the dielectric layers prevent the passage of substantial conductive current from the conductor members to the gaseous medium and also serve as collecting surfaces for ionized gaseous medium charges (electrons, ions) during the alternate half cycles of the A.C. operating potentials, such charges collecting first on one elemental or discrete dielectric surface area and then on an opposing elemental or discrete dielectric surface area on alternate half cycles to constitute an electrical memory.

An example of a panel structure containing non-physically isolated or open discharge cells is disclosed in U.S. Pat. No. 3,499,167 (incorporated herein by reference) issued to Theodore C. Baker, et al.

An example of a panel containing physically isolated cells is disclosed in the article by D. L. Bitzer and H. G. Slottow entitled "The Plasma Display Panel — A Digitally Addressable Display With Inherent Memory," Proceeding of the Fall Joint Computer Conference, IEEE, San Francisco, Cal., Nov. 1966, pages 541-547 and also in U.S. Pat. No. 3,559,190 (incorporated herein by reference).

In the construction of the panel, a continuous volume of ionizable gas is confined between a pair of dielectric surfaces backed by conductor arrays typically forming matrix elements. The two conductor arrays may be orthogonally related sets of parallel lines (but any other configuration of conductor arrays may be used). The two arrays define at their intersections a plurality of opposed pairs of charge storage areas on the surfaces of the dielectric bounding or confining the gas. Thus, for a conductor matrix having H rows and C columns the number of elemental or discrete areas will be twice the number of elemental discharge cells.

In addition, the panel may comprise a so-called monolithic structure in which the conductor arrays are created on a single substrate and wherein two or more arrays are separated from each other and from the gaseous medium by at least one insulating member. In such a device the gas discharge takes place not between two opposing elemental areas on two different substrates, but between two contiguous or adjacent elemental areas on the same substrate; the gas being confined between the substrate and an outer retaining wall.

It is also feasible to have a gas discharge device wherein some of the conductive or electrode members are in direct contact with the gaseous medium and the remaining electrode members are appropriately insulated from such gas, i.e., at least one insulated electrode.

In the prior art there exists D.C. (direct current) devices where the electrodes consist of an anode and a cathode which are typically in direct contact with the ionizable gaseous medium. It is also possible to construct such D.C. devices utilizing a dielectric overcoat, i.e., the same structure and configuration as an A.C. gas discharge display/memory panel described hereinbefore.

A wide variety of such devices exist in the prior art. Examples of such devices are disclosed in U.S. Pat. Nos. 2,142,106; 3,260,880; 3,720,452; 3,725,713; 3,237,040, and 3,497,751, all of which are incorporated herein by reference.

The present invention is intended to relate to the manufacture of all types of A.C. and D.C. display panels.

In addition to the matrix configuration, the conductor arrays of the display device (D.C. or A.C.) may be shaped otherwise. Accordingly, while the preferred conductor arrangement is of the crossed grid type as discussed herein, it is likewise apparent that where a maximal variety of two dimensional display patterns is not necessary, as where specific standardized visual shapes (e.g., numerals, letters, words, etc.) are to be formed and image resolution is not critical, the conductors may be shaped accordingly (e.g., a segmented digit display).

The gas is selected to produce visible light and invisible radiation which may be used to stimulate a phosphor (if visual display is an objective) and a copious supply of charges (ions and electrons) during discharge.

In the prior art, a wide variety of gases and gas mixtures have been utilized as the gaseous medium in a number of different gas discharge devices. Typical of such gases include pure gases and mixture of $CO$; $CO_2$; halogens; nitrogen; $NH_3$; oxygen; water vapor; hydrogen; hydrocarbons; $P_2O_5$; boron fluoride acid fumes; $TiCl_4$; air; $H_2O_2$; vapors of sodium, mercury, thallium, cadmium, rubidium, and cesium; carbon disulfide; $H_2S$; deoxygenated air; phosphorus vapors; $C_2H_2$; $CH_4$; naphthalene vapor; anthracene; freon; ethyl alcohol; methylene bromide; heavy hydrogen; electron attaching gases; sulfur hexafluoride; tritium; radioactive gases; and the so-called rare or inert Group VIII gases.

To obtain uniform resolution over the entire display surface of a gas discharge panel, it is imperative that the space between opposing walls of the gas envelope be uniform and that the walls of the chamber be sealed to provide a gas filled container.

Several methods of sealing such panels with various spacers therebetween appear in the prior art. For example, epoxy has been used as a sealant but produces impurities in the gas mixture which decreases the life of the panel. In situ fabrication of gas panels with granular solder glass as a sealant and spacers has also been utilized but uniform deposition of the solder glass is difficult and considerable numbers of cells are obliterated. In order to resolve these problems a soft glass rod or granular sealant and a hard glass rod spacer as has been used, as described in U.S. Pat. No. 3,778,127 (incorporated herein by reference) wherein the upper plate of the gas panel settles upon the spacing rods during a bakeout operation thus establishing a predetermined and uniform spacing within the envelope. However, such glass spacers are rigid, tend to crack and are detrimentally conspicuous to the observer.

Another glass sealing composition especially suitable for sealing together the two glass substrates of a multiple gas discharge display panel so as to provide a hermetically sealed ionizable gas chamber is disclosed in U.S. Pat. No. 3,734,702 (incorporated herein by reference) comprising a lead borosilicate solder glass containing 18% by weight of aluminum titanate which inhibits crystallization thus developing a seal with even stress concentration.

In U.S. Pat. No. 3,837,724 a method is disclosed for the fabrication of a gas panel which includes dipasiting parallel lines of electrical conductors on a pair of glass plates, applying a glass coating thereover, placing a sealant between said plates around the periphery thereof, spacing the plates at a predetermined distance apart, firing the assembly in an oven to seal the glass plates together with a gap therebetween, evacuating the gap, then filling it with an inert gas and exposing each parallel line at one end of each glass plate as an electrical contact.

Although the fabrication of such panels appears to be relatively simple, it is imperative that the glass plates be thoroughly cleaned before deposition of the electrodes since any contamination will result in unreliable operation of the finished panel. Quite frequently, the substrate will contain sealing glass particles even after vehicle burn-out at 630° F. for 20 minutes. The present invention is directed to a method of pre-attaching sealing glass to a substrate so that such contamination is avoided.

SUMMARY OF THE INVENTION

The principal object of this invention is to provide a glass substrate with sealing glass pre-attached thereto that will permit subsequent cleaning of the substrate prior to thin film dielectric and dielectric over-coating applications.

An equally important object is to provide a method for attaching sealing glass to a substrate and thus eliminate substrate contamination from sealing glass particles after or during vehicle burn-out.

In accordance with the foregoing objects, commercial solder glasses are first applied to one surface adjacent the periphery of glass substrates with electrical conductors deposited in parallel lines thereon and pre-fired or burned out into glassy states by heating at about 10° F. per minute up to 920° F., holding the substrate at that temperature for about 1 hour and then colling at 10° F. per minute to room temperature to form a glass substrate with the solder glass attached thereto. The substrates are then sprayed with various dielectric overcoats (preferably a lead glass frit), one substrate is placed over the other with the parallel lines of one extending orthogonally to the parallel lines of the other, appropriate spacers are inserted and the substrates are sealed by using a heating cycle of 2° to 7° F. per minute to a temperature of from 745° to 960° F., holding the assembled substrates at the peak temperature for 1 to 2 hours and then cooling to room temperature at the same rate. Such a process avoids the dusting, cracking and flaking often experienced with precured glass. In addition, the gap between substrates is kept uniform when the precured solder glass melts during the final heat cycle.

DESCRIPTION OF THE PREFERRED EMBODIMENTS

The solder glass compositions used in this invention can be any of those which are commercially available whether of the vitreous or devitrifiable type but the vitreous type is preferred. Exemplary solder glasses for use herein are described in U.S. Pats. Nos. 2,866,298; 2,889,952; 2,931,142; 2,936,923; 3,061,664; 3,063,198; 3,080,328; 3,088,833; 3,088,834; 3,088,835; 3,127,278; 3,250,631; 3,291,586; 3,368,024 and 3,778,127. Typical specific solder glass compositions which have been used successfully in the practice of this invention are shown in the following table along with their softening points.

| Wt. % | A | B | C | D |
|---|---|---|---|---|
| PbO | 73.3 | 72.0 | 72.0 | 71.0 |
| $B_2O_3$ | 13.4 | 15.0 | 15.0 | 10.0 |
| $SiO_2$ | 13.3 | 4.0 | 2.0 | 2.0 |
| $Al_2O_3$ | — | 5.0 | 5.0 | — |
| ZnO | — | 4.0 | 6.0 | 15.9 |
| $SnO_2$ | — | — | — | 1.1 |
| Softening Pt. ° F. | 845 | 811 | 800 | 400 |

The solder glass is preferably in the form of a rod prior to attachment to the substrate. To prepare such rods, a melt containing the weight percent of each oxide in the compositions hereinbefore designated is cast into rods ¼ inch in diameter and redrawn into rods 3 to 40 mils in diameter and 2 inches long. These rods are then applied to the glass substrate of a gaseous discharge display panel by using the heating cycle best suited for the type of glass composition used. Alternatively, these same compositions can be cast into chips, ground to about 400 U.S. Screen Series mesh and mixed in a ratio of about 6 parts by weight of glass to one part by weight of vehicle containing equal parts by weight of poly(alpha methyl) styrene and terpineol for screen printing to the substrate before it is prefired into a glassy state to burn out the vehicle and permanently attach the solder glass thereto.

The following examples set forth the best modes now contemplated for practicing this invention.

EXAMPLE 1

A solder glass of composition A was mixed in a ratio of 6 parts by weight of glass to one part by weight of a vehicle containing equal parts by weight of poly (alpha methyl) styrene and terpineol and screen printed to one adjacent the periphery of a ¼ inch thick glass substrate with 128 electrical conductors deposited thereon in a parallel array of 60 lines per inch. The substrate was then fired at 10° F. per minute to 920° F., held at that temperature for 30 minutes and finally cooled to room temperature at a constant rate of 10° F. per minute to firmly attach the solder glass and burn out the vehicle. A thin film dielectric in the form of a glass frit was sprayed over the parallel conductors and glass spacers melting at 1300° F. were inserted at 2 inches intervals between the conductors. This process was repeated with a similar substrate. One substrate screen printed on the periphery with the above pre-fired material was then placed over the other substrate so that the parallel lines of one were orthogonal to the parallel lines of the other and the substrates were sealed together by using a heating cycle of 2° F. per minute to 960° F., holding at that temperature for 90 minutes and then cooling to room temperature at 1° F. per minute. The gap formed between the substrates was 4.7 mils and when tested under vacuum no leaks were detected.

EXAMPLE 2

The same procedure as in Example 1 was followed except that a solder glass of composition B was mixed with the vehicle and burned out into a glassy state using a heating cycle of 10° F. per minute to 860° F., holding at that temperature for 30 minutes and cooling at a rate of 10° F. per minute to room temperature. The substrate with solder glass attached was free of all contamination and provided easy assembly and re-alignment of substrate parts prior to sealing to another substrate.

EXAMPLE 3

Solder glass of composition C was drawn into rods 40 mils in diameter and applied as a ribbon 12/32 inches wide to the periphery of a glass substrate on which was deposited 512 parallel gold electrical conductors spaced 60 lines per inch. The rods were then attached to the substrate by heating at 10° F. per minute to 780° F., holding at that temperature for 1 hour and cooling to room temperature at a rate of 10° F. per minute. The seal between the substrate and solder glass was permanent and did not separate upon further handling and processing.

EXAMPLE 4

Solder glass of composition D in the form of rods 25 mils in diameter was attached to the periphery of a glass substrate as described in Example 3 except that the heating cycle used was 10° F. per minute to 750° F., holding at that temperature for 30 minutes and then cooling to room temperature at the same rate. The glass substrate with solder glass attached thereto was satisfactory in every respect for later sealing to a similar substrate.

What I claim is:

1. A method of producing a glass substrate with electrical conductors deposited thereon suitable for gas panel fabrication which comprises drawing a vitreous or crystallizing solder glass consisting essentially of, on a weight basis, 72% PbO, 15% $B_2O_3$, 4% $SiO_2$, 5% $Al_2O_3$ and 4% ZnO and having a softening point of 811° F into at least one rod 3 - 40 mils in diameter, applying said rod to one surface of said substrate adjacent the periphery thereof, and pre-firing said substrate for a period of time and at a temperature sufficient to permanently attach the solder glass thereto in a highly sintered or glassy state which will reflow and seal at a predetermined sealing temperature.

2. A method of producing a glass substrate with electrical conductors deposited thereon suitable for gas panel fabrication which comprises drawing a vitreous or crystallizing solder glass consisting essentially of, on a weight basis, 72% PbO, 15% $B_2O_3$, 2% $SiO_2$, 5% $Al_2O_3$, and 6% ZnO and having a softening point of 800° F into at least one rod 3 - 40 mils in diameter, applying said rod to one surface of said substrate adjacent the periphery thereof, and pre-firing said substrate for a period of time and at a temperature sufficient to permanently attach the solder glass thereto in a highly sintered or glassy state which will reflow and seal at a predetermined sealing temperature.

3. A method of producing a glass substrate with electrical conductors deposited thereon suitable for gas panel fabrication which comprises drawing a vitreous or crystallizing solder glass consisting essentially of, on a weight basis, 71% PbO, 19% $B_2O_3$, 2% $SiO_2$, 15.9% ZnO, and 1.1% $SnO_2$ and having a softening point of 400° F into at least one rod 3 - 40 mils in diameter, applying said rod to one surface of said substrate adjacent the periphery thereof, and pre-firing said substrate for a period of time and at a temperature sufficient to permanently attach the solder glass thereto in a highly sintered or glassy state which will reflow and seal at a predetermined sealing temperature.

* * * * *